United States Patent [19]

He

[11] Patent Number: 5,642,407

[45] Date of Patent: Jun. 24, 1997

[54] SYSTEM AND METHOD FOR SELECTED AUDIO RESPONSE IN A TELECOMMUNICATIONS NETWORK

[75] Inventor: Jingsha He, Plano, Tex.

[73] Assignee: MCI Corporation, Washington, D.C.

[21] Appl. No.: 581,119

[22] Filed: Dec. 29, 1995

[51] Int. Cl.[6] .......................... H04M 1/64; H04M 15/00; H04M 3/42; H04M 3/00

[52] U.S. Cl. .................. 379/87; 379/88; 379/127; 379/207; 379/257

[58] Field of Search .................. 379/67, 69, 70, 379/71, 82, 84, 87, 88, 89, 127, 142, 257, 201, 207

[56] References Cited

U.S. PATENT DOCUMENTS

| | | | |
|---|---|---|---|
| Re. 34,880 | 9/1995 | Sleevi | 379/67 |
| 5,321,740 | 6/1994 | Gregorek et al. | 379/67 |
| 5,333,186 | 7/1994 | Gupta | 3279/201 |
| 5,428,670 | 6/1995 | Gregorek et al. | 379/67 |
| 5,436,957 | 7/1995 | McConnell | 379/88 |
| 5,448,625 | 9/1995 | Lederman | 379/67 |
| 5,452,350 | 9/1995 | Reynolds et al. | 379/220 |

Primary Examiner—Krista M. Zele
Assistant Examiner—Harry S. Hong

[57] ABSTRACT

A system and method for selected audio response to a telephone call that results in an unsuccessful connection. If a condition within the set of conditions is satisfied based on attributes associated with the caller or the telephone call, an action list associated with the satisfied condition is executed. The action list can comprise a selected audio response that is transmitted to the caller of the unsuccessful connection.

21 Claims, 5 Drawing Sheets

FIG. 4B ns network. Still more particularly, the present invention relates
SYSTEM AND METHOD FOR SELECTED AUDIO RESPONSE IN A TELECOMMUNICATIONS NETWORK

BACKGROUND OF THE INVENTION

1. Field of the Invention

The present invention relates generally to telecommunications systems, and more particularly, to a system and method for selected audio response in a telecommunications network. Still more particularly, the present invention relates to a system and method for automatic handling of an unsuccessful telephone call in accordance with particular attributes of the telephone call.

2. Related Art

A first telephone user, hereinafter referred to as a caller, calls a second telephone user, hereinafter referred to as a callee. The caller may encounter an unsuccessful connection, for example, as embodied by a well known busy signal indicating the callee cannot be reached. In one example, the callee may be busy with a current telephone call. In a second example, a switch involved in the path of the telephone call may have reached capacity. This latter example is a result of the provisioning of a finite set of network resources designed to service a predefined load. As such, a typical telecommunications network will encounter unavoidable instances of unsuccessful connections.

Regardless of the reasons behind unsuccessful connections, a telephone company incurs a significant amount of phone call processing that produces no revenue. One solution to this problem is to charge the caller of an unsuccessful connection with a processing fee. This solution, however, remains unattractive due to the public's historical notion that uncompleted calls should not be billed. In other words, the public is unwilling to pay for a service that they perceive as not being used.

Another solution for this revenue generation problem is therefore required. Specifically, what is needed is a revenue generation technique that capitalizes on the frequent occurrence of unsuccessful connections. This revenue generation technique must not rely upon the caller that incurs the phone call processing.

SUMMARY OF THE INVENTION

The present invention solves this problem by recognizing that advertising is a significant revenue generation technique when a proper market exists. Generally, companies are willing to make large expenditures in advertising if they are assured of reaching a substantial portion of their target market. Telephone advertising plays a significant role in this respect.

The present invention capitalizes on this observation by providing a system and method for playing audio advertisements to selected callers of unsuccessful connections. To provide this functionality, a set of conditions that identifies which callers should be selected is first defined. Each of the conditions is defined by an arithmetic and/or boolean combination of attributes that are associated with an unsuccessful connection.

Next, for each condition in the set of conditions, an associated action list is also defined. Each action list can include an audio response and a command code. An audio response can include an advertisement for a particular company. A command code, on the other hand, can define a sequence of actions or invoke executable programs.

After this setup phase defines a set of conditions and corresponding action lists, the system is ready for processing unsuccessful connection information. First, a set of attributes associated with a telephone call is retrieved. If the telephone call results in an unsuccessful connection, the system determines whether any of the conditions are satisfied by the set of retrieved attributes.

In one embodiment, the set of attributes is sequentially compared to each condition in the set of conditions, until a condition is satisfied. Conditions are defined through arbitrary combinations of attributes using boolean and/or arithmetic operators. After the system determines that a condition is satisfied, it executes the corresponding action list. The action list can include the transmission of an audio advertisement to the caller when the caller encounters an unsuccessful connection.

BRIEF DESCRIPTION OF THE FIGURES

The foregoing and other features and advantages of the invention will be apparent from the following, more particular description of a preferred embodiment of the invention, as illustrated in the accompanying drawings. In the drawings, like reference numbers indicate identical or functionally similar elements. Additionally, the left-most digit of a reference number identifies the drawing in which the reference number first appears.

FIGS. 2-4B illustrate flowcharts of the audio response process, according to a preferred embodiment of the present invention.

DETAILED DESCRIPTION OF THE PREFERRED EMBODIMENTS

In accordance with the present invention, a telephone company can play audio advertisements for various companies to selected telephone customers who encounter unsuccessful call situations. This revenue generation scheme allows a telephone company to supplement its revenue stream as an offset to the phone processing charges that accompany frequent unsuccessful call completion situations. Generally, unsuccessful call completion situations include busy local lines, busy intralata lines, busy interlata lines, busy international lines, invalid phone numbers, or improperly dialed phone numbers. This list represents a general class of unsuccessful connections and is not intended to be exhaustive. A telephone company can generate a custom list that is dependant upon any service or physical segment of their telecommunication network.

Figure 1:
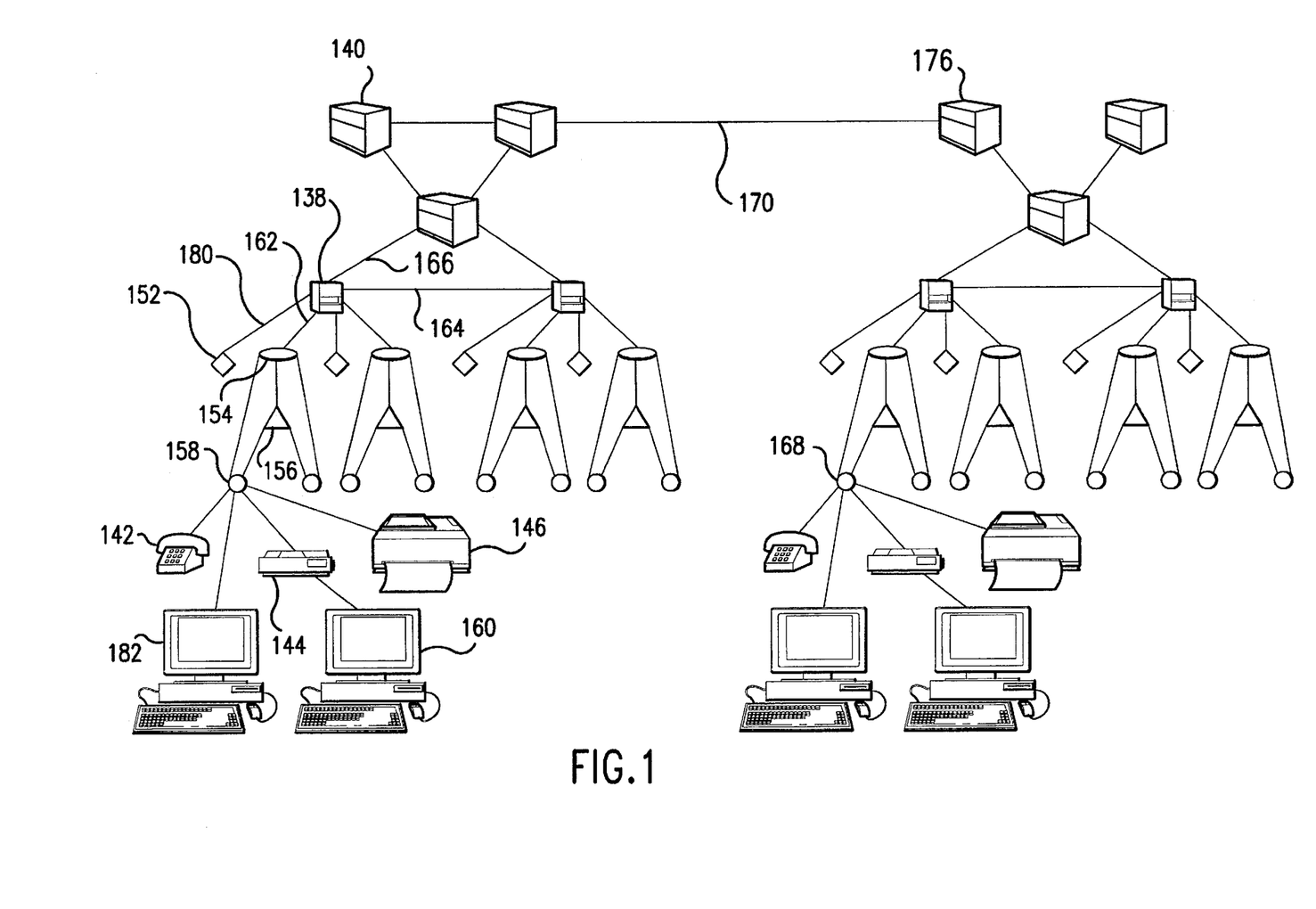
FIG. 1 illustrates an exemplary telecommunications network in which the present invention can be used.

FIG. 1 shows an exemplary telecommunications network 100 in which the present invention can be used. Elements having the same icons or shapes represent identical systems. The term network, as used herein, refers to a collection of two or more nodes linked together with communications functionality. Any node subset of FIG. 1, including two or more nodes which can communicate with each other, is also a network. The telecommunications network may also be a subset of a larger network. Lines shown between nodes in FIG. 1 demonstrate communications paths, links or spans. For example, a Direct Access Line (DAL) span 180 is at least one trunk between switch 138 and a directly connected customer Private Branch Exchange (PBX) 152. Point of Presence (POP) 154 is connected to Local Tandem 156 and an End Office (EO) 158. EO 158 is the Local Exchange Company (LEC) switching center which provides dial tone and local service to end users.

End users use equipment such as a telephone 142, an internal modem connected PC 182, a PC 160 which is connected with an external modem 144, a fax machine 146, or the like. Telephone use refers to using any equipment on a telephone line, cellular telephone connection, or the like.

Spans 162, 164 and 166 include at least a single trunk. An end user of EO 168 is able to communicate with an end user of EO 158 through a single circuit by way of a link or span 170. Spans 170, 164 and 166 can include microwave, satellite or optical fiber facilities.

Within telecommunications network 100, a telephone company implements the present invention by defining a predicate action table. An example of a predicate action table is illustrated in Table 1 below.

TABLE 1

| Conditions | Action List |
| --- | --- |
| Condition 1 | "The destination is busy. We would just like to take this opportunity to thank you for using MCI."; % B |
| Condition 2 | "We're sorry, the line is busy. Relax, have a Cool Cola and try again. There is nothing more refreshing than a Cool Cola"; % R |
| ... | ... |
| Condition N | "Yep, the line is busy."; % Sx:\server\voicsw\travel.exe; % B |

Generally, the predicate action table defines a list of actions that correspond to specified conditions. In the context of selected advertisements, a specified condition serves to identify specific callers based on a combination of attributes associated with an unsuccessful connection.

Attributes can be separated into two general categories, caller attributes and telephone call attributes. Caller attributes include those attributes that are stored in a particular customer telephone account record. Examples of information stored in a customer telephone account record include the address, name, county, interexchange company (IXC), last phone bill amount, etc. The content of the telephone account record can include any caller information that the telephone company chooses to enter.

Telephone call attributes, on the other hand, include attributes that pertain to the call itself. Examples of this type of attribute include the source and destination of the call (i.e., phone numbers) and the date and time of the call. Additionally, telephone call attributes may further include billing information (e.g., calling card number or credit card number) for the call.

All of the attribute information associated with a particular call is transmitted with the telephone call. In one embodiment, the attribute information is used by a switch in the path of the call to implement the features of the present invention. In other embodiments, the attribute information is off-loaded, by a switch in the path of the call, to a switch that is given responsibility for implementing the features of the present invention. This process is described in greater detail below.

In a preferred embodiment, the attribute information is transmitted in an LIFD format. A description of the LIFD format is provided with reference to Table 2 below. In the LIFD data format, the L-field is a single byte that identifies the length of the LIFD data field, including the L, I and F fields. The I-field is a single byte that identifies the type of data (e.g., state, zipcode or country). The F-field is a single byte that identifies the data format. In one embodiment F=01 specifies numeric data while F=02 specifies character data. Finally, the D-field is the data itself.

TABLE 2

| Attribute | Identifier | Type | Values |
| --- | --- | --- | --- |
| State | 37x | Character | 16 bits for two characters (e.g. "TX") |
| Zip Code | 38x | Character | 5 characters |
| Country | 39x | Numeric | 8 bits for numeric value (e.g. 1 = USA) |
| . | . | . | . |
| . | . | . | . |
| . | . | . | . |

In the ZIP Code example of Table 2, a ZIP Code attribute is encoded as the LIFD hexadecimal byte stream 0838023737383530x. The L-field 08 is the byte length of the attribute data stream member (i.e., 8 bytes), the I-field 38 identifies the data as Zip Code data, the F-field 02 specifies character data, and the D-field 3737383530 specifies the zip code 77850 in ASCII characters.

In a preferred embodiment, attribute data is packed back to back and encapsulated in a D portion of a primary LIFD. The primary LIFD specifies a byte length (L) of the primary LIFD, an identifier (I) denoting that attribute data is contained therein, a format (F) of complex (i.e., 00) indicating there are sub-LIFDs in the primary LIFD data, and the back to back attribute data streams are contained within the D portion of the primary LIFD. Various alternative embodiments may represent attribute data in other data stream formats without departing from the spirit and scope of the invention.

Generally, standardized LIFD definitions are used to ensure compatibility at all points in telecommunications network 100. Therefore, a I-field of 38 is known to be ZIP code data by applicable processes within telecommunications network 100. Standard LIFD definitions can be hard coded into the systems that build, parse and compile the attribute data streams. Clearly, in an alternative embodiment, configurable LIFD definitions can be used. An embodiment using configurable LIFD definitions would transmit key information along with the LIFD data to enable receiving processes to parse and decode the LIFD data using the key information.

Using the attribute data contained in LIFD messages, the audio response system can determine if the attributes satisfy a given condition. These conditions can be complex. Conditions are specified using variables that are identified by descriptive labels of attribute data. For example, caller attributes can include variables such as STATE or ZIP-CODE. Telephone call attributes, on the other hand, can include variables such as SOURCE (i.e., number of caller), TARGET (i.e., number of callee), DATE or TIME. To specify a condition, a relation between variables is defined. In a preferred embodiment, conventional boolean (e.g., AND, OR, etc.) and arithmetic (e.g., >, <, etc.) are used to define relations between variables. These relations are further specified using parentheses to enforce precedence. Clearly, any programing language operator that facilitates complex expressions can be used to specify conditions.

Examples of possible conditions are illustrated in the examples below along with their meanings. In these illustrations, a wildcard (i.e., "*") is permitted to specify classes of values.

EXAMPLE 1

Cond: (STATE='TX') AND (SOURCE='214*') AND (TARGET='800*')

Meaning: If the caller's state is Texas AND the caller's phone is in the 214 area code AND the called number is an 800 number, then execute the corresponding action list.

EXAMPLE 2

Cond: ((COUNTRY=1) OR (COUNTRY=6)) AND (TARGET='5669875354')

Meaning: If the caller's country is (USA or CANADA) AND the called number is 566-987-5354, then execute the corresponding action list.

EXAMPLE 3

Cond: (TARGET=*5551212) AND (TIME<=17:00) AND (TIME >8:00)) AND (DATE<=12/24/95) AND (DATETIME>09/11/95;8:00)

Meaning: If the destination number is an information number (555-1212) at any area code AND the time of the call is between 8:00AM and 5:00PM for any particular day AND the date of the call is before or on Christmas Eve of 1995 AND the date/time stamp of the call is after 8:00AM of Sep. 11, 1995, then execute the corresponding action list.

The specification of a condition is merely the first step in the process of creating an executable function call. The process of creating a function call is illustrated by the flow chart of FIG. 2. The function call generation process begins in step 204, where a condition is specified. As noted above, this step requires the specification of a relation between attribute variables.

Figure 2:
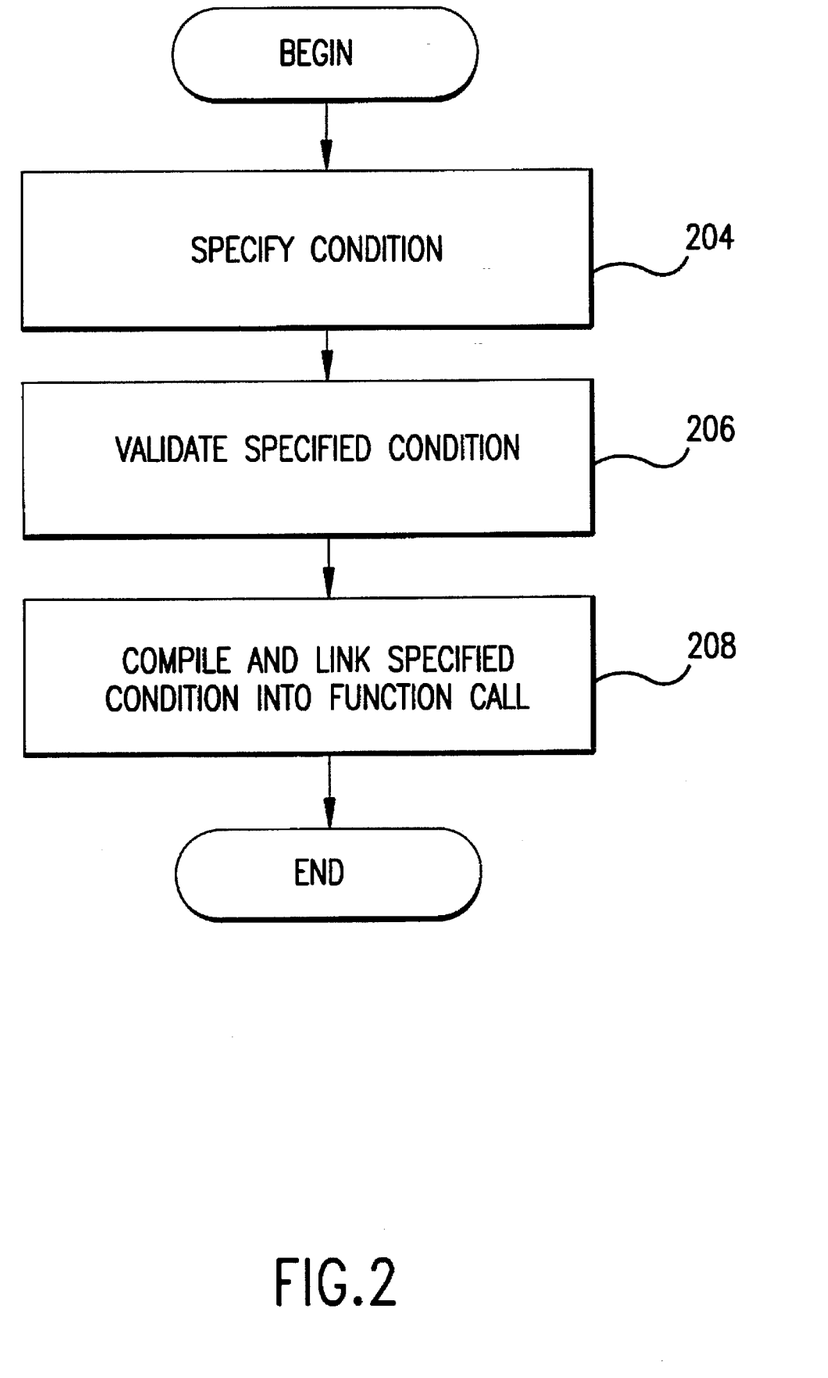

After the specification is complete, the system then validates the specified condition in step 206. The validation process determines whether the specified condition is syntactically correct (e.g., misspelled variable or non-matching parenthesis). After validation is complete, in step 208, the specified condition is compiled and linked into a function call. These function calls preferably accept parameters that represent memory addresses. In one embodiment, memory addresses for caller attribute information, telephone source information, telephone destination information, and date/time stamp information are provided for a function call. A null value for any parameter implies that the function call requires no variables for that particular attribute.

With these function calls, the audio response system determines if a caller associated with an unsuccessful connection will receive a particular audio response. As shown in Table 1, each condition has an associated action list that defines a list of actions to be sequentially executed. An action list typically comprises audio responses and/or command codes. Audio responses can be specified by any method that is designed to play an audible message. For example, an audio response can be specified as a prerecorded message, a wave file reference, text for a subsequent text-to-speech process, or an executable program reference.

Command codes, on the other hand, include predefined syntactical references with an assigned meaning. For example, command codes can be defined as:

%B=provide customary busy signal,
%R=Repeat items in action list, starting with first element,
%Rn=Repeat items in action list, starting with nth element,
%S=Invoke (or spawn) a program (arguments permitted)

As illustrated in Table 1 above, an action list can include a combination of audio responses and command codes. For example, the action list associated with condition 1 includes a standard busy message followed by a customary busy signal. In one embodiment, the action list is defined in a freeflow form with sequentially executed portions being separated by semicolons. In this format, the absence of a trailing semicolon implies a last element in the action list. Any number of elements can appear in the action list.

Figure 3:
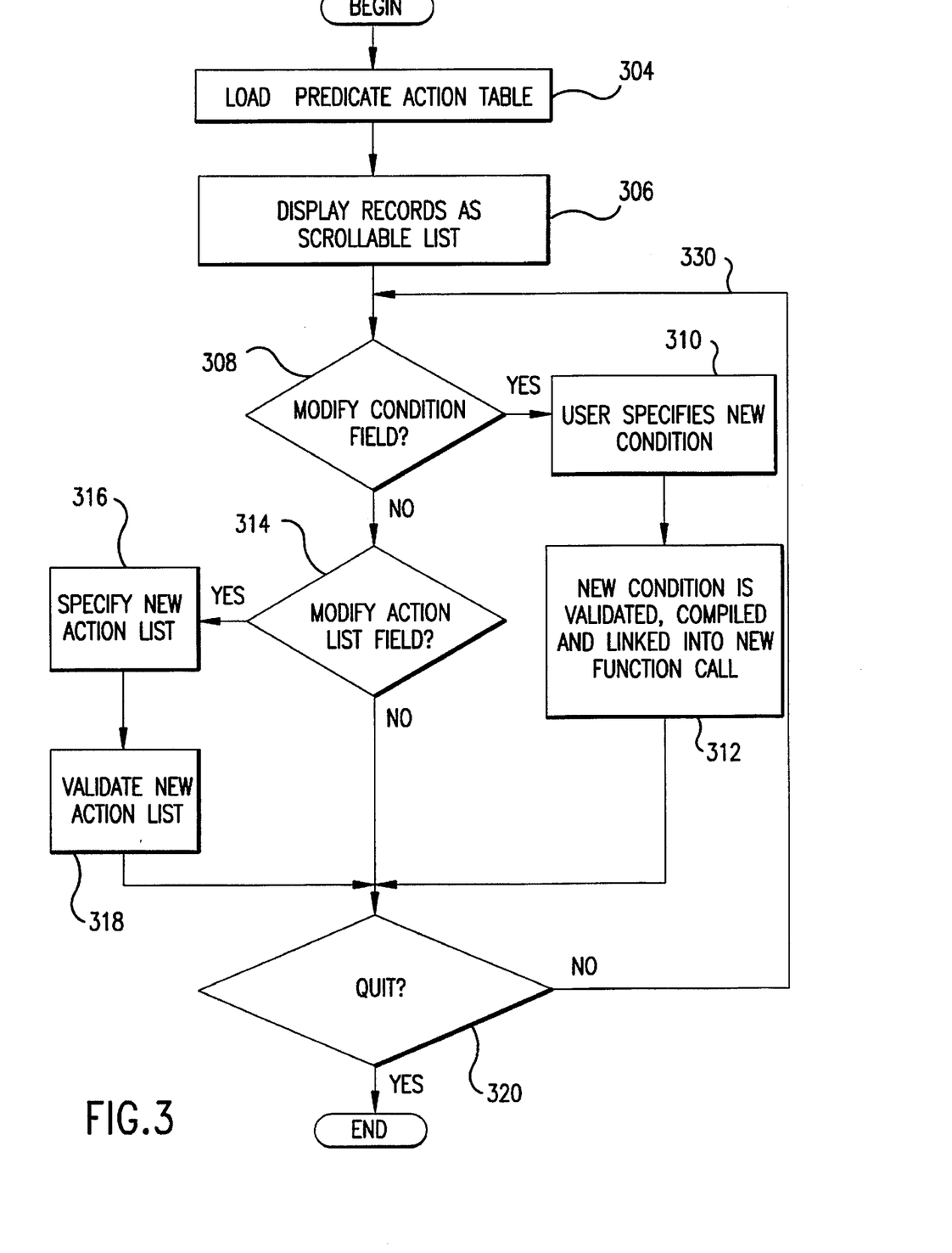

FIG. 3 illustrates a flowchart demonstrating the maintenance of the predicate action table that stores the set of predefined conditions and associated action lists. Generally, records in the predicate action table can be stored in a database (not shown). The maintenance process begins in step 304 where a previously defined predicate action table is loaded. In step 306, the records within the retrieved predicate action table are displayed in a graphical user interface as a scrollable list.

In step 308, the system waits to determines if the user wishes to modify a condition field through an invoked selection of an entry in the scrollable list. If so, the user specifies a new condition in step 310. This new specified condition must be validated, compiled and linked in accordance with steps 204, 206, and 208 of FIG. 2. The process of generating a new executable function call in response to the newly specified condition is represented by step 312.

If the user, in step 314, decides to modify an action list field rather than a condition field through an invoked selection of an entry in the scrollable list, the process continues to step 316. In step 316, the user first specifies a new action list. Step 316 may require that the user record a message, specify a wave file reference, enter text for a subsequent text-to-speech process, specify a program reference, specify means for playing an audible message, or specify command codes. Next, in step 318, the new action list is validated. This process may involve both system and user validation. System validation involves the verification of proper syntax and format of command codes and/or audio references. User validation, on the other hand, can involve an option for the user to activate the newly specified action list to determine if additional modification is necessary. In other words, the user is allowed to listen to the playback of the modified action list.

After a condition field or action list field is modified, the process continues to step 320 where the user determines whether additional fields require modification. If additional modification is desired by the user, the process continues back to step 308 via loop 330. If all modifications are completed and the user selects to exit from the maintenance process, the maintenance program ends. Generally, any modification to an action list field or a condition field is appropriately reflected in the active scrollable list.

Having thus described the process of maintaining the predicate action table through the specification of conditions and action lists, a description of system processing based on the predicate action table is now described. This description is provided with reference to FIGS. 4A and 4B which illustrate a flow chart of the processing steps in selecting audio responses for playback to callers of unsuccessful connections.

Figure 4A:
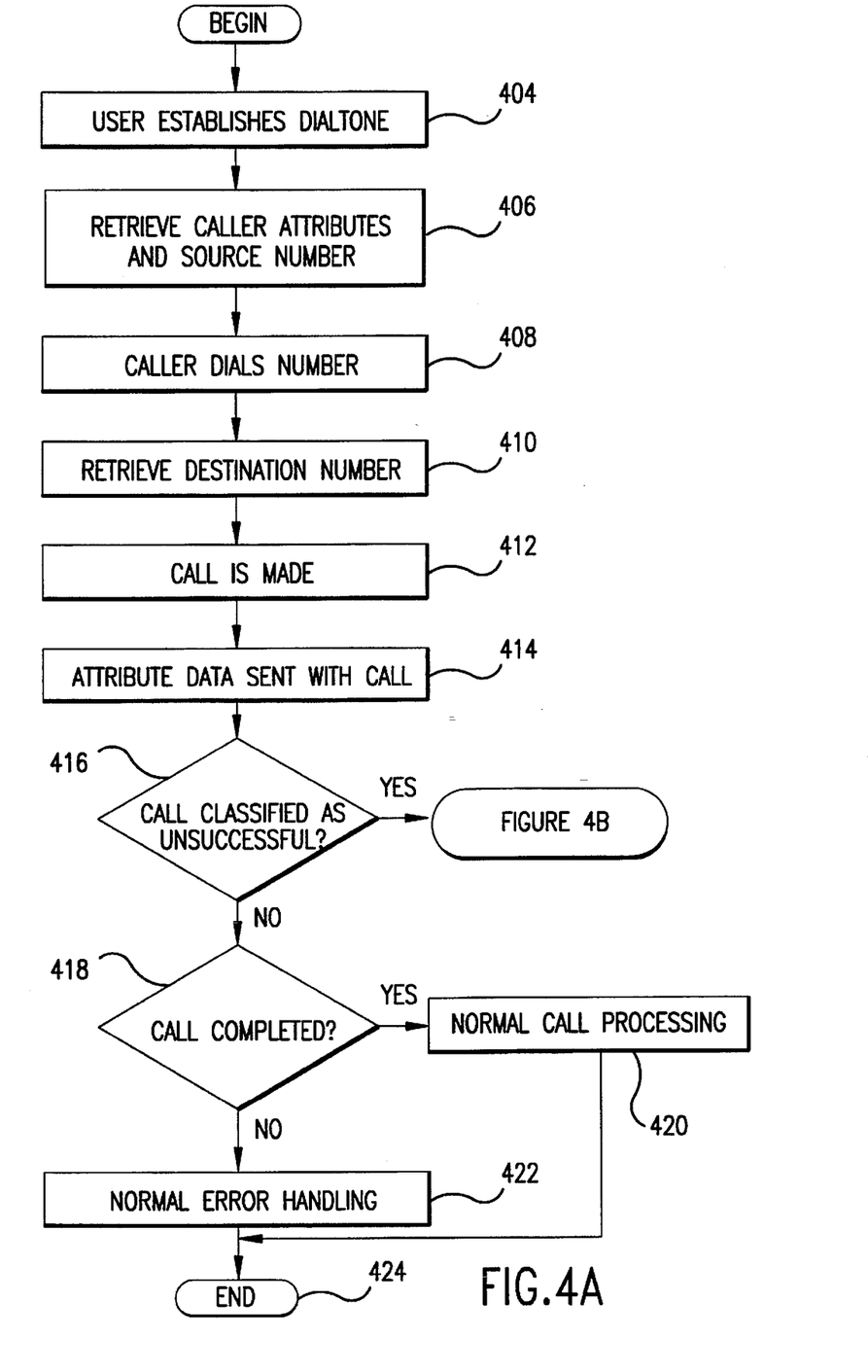

This process begins in step 404 where a caller prepares to make a telephone call by initiating a protocol to establish dial tone. Once the dial tone is established to the caller's phone from the end office, the caller's attributes are retrieved from the caller's end office database (not shown) in step 406. The caller's attributes can also be retrieved from a database in an office that is connected to the caller's end office. Additionally, in step 406, the caller's number is also retrieved from the same database. Next, in step 408, the caller dials-the number of the callee. After the call process for the dialed number is initiated, the callee's phone number is retrieved in step 410. Thereafter, the phone call is made in a customary manner in step 412. Transmitted along with this phone call is the retrieved attribute data using the LIFD format described above. This process is represented by step 414.

Generally, attribute information can be transmitted in-band or out-of-band with respect to the actual phone call. The actual implementation depends upon the architecture of the signaling network. For example, in an SS7 network, attributes are transmitted out-of-band to a target switch.

Continuing in step 416 of FIG. 4A, the audio response system determines whether the call is classified as unsuccessful. As noted above, this determination is based on a customizable set of unsuccessful call types (e.g., circuit busy, improperly dialed number, etc.). If the call is classified as an unsuccessful call type, processing with respect to the predicate action table follows. This processing is illustrated in FIG. 4B and will be described in more detail below.

If the call is not classified as an unsuccessful call type, a second determination is made in step 418 concerning whether the call was completed. This second determination may be required depending upon the completeness of the class of unsuccessful call types. If the class of unsuccessful call types includes all calls that were not completed, then step 418 is not required. If the system determines in step 418 that the call was completed, normal call processing proceeds in step 420. Thereafter, the process terminates in step 424. On the other hand, if the system determines in step 418 that the call was not classified as unsuccessful and was not completed, then a customary error handling procedure is invoked in step 422. The customary error handling procedure can include the playback of an error message to the caller. Thereafter, the process terminates in step 424.

Figure 4B:
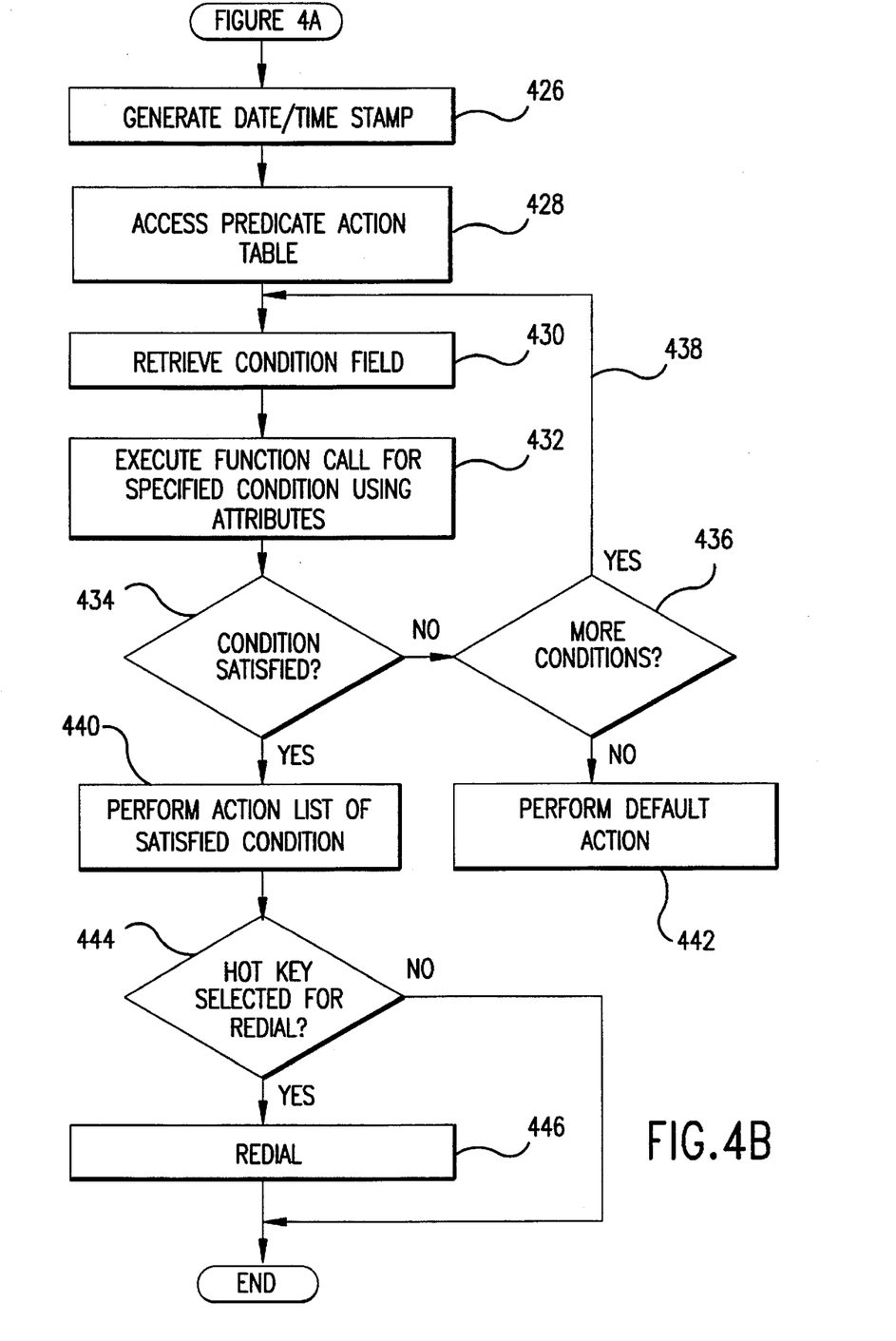

If the call was classified as unsuccessful, the process continues from step 416 of FIG. 4A to step 426 of FIG. 4B. In step 426, a date/time stamp for the unsuccessful call is generated. Next, in step 428, the predicate action table is accessed. Generally, the predicate action table can be replicated across telecommunications network 100 or have separate maintained instances throughout telecommunications network 100. Replication may be desirable in common geographical areas.

From the predicate action table, the condition field for the first record is selected in step 430. Next, in step 432, the function call for the specified condition field is executed using the call attributes for the unsuccessful call as input parameters. If the system determines, in step 434, that the condition is not satisfied, a second determination is made in step 436. Specifically, the audio response system determines if there are more conditions in the predicate action table to examine. If more conditions exist, the process returns in loop 438.

In a preferred embodiment, the order of examination of the condition fields in the predicate action table is sequential. Accordingly, the order of records in the predicate action table is very important since conditions may intersect for a particular unsuccessful call. Generally, the predicate action table should not include a number of records that exceeds a system-defined threshold that causes excessive search times. In other embodiments, the order of processing of the records in the predicate action table is based on a tree-structured index.

In either case, if the system determines, in step 434, that a condition is satisfied, the process continues to step 440. In step 440, the action list associated with the satisfied condition is executed. As noted above, the action list to be executed can include command codes and audio responses that include a company's audio advertisement. If, however, the system determines, in step 436, that none of the conditions are satisfied, a default action list may be executed in step 442. In one example, the default action list may simply instruct the system to provide the standard busy signal to the caller of the unsuccessful connection. Generally, the default action list represents an alternative embodiment in which a predicate action table is not used. In this alternative embodiment, an unsuccessful call is indiscriminately responded to by an audio message contained within the default action list.

After an action list has been performed, the system also permits the caller to select an automatic redial feature. This redial feature is initiated by the caller's selection of a hot key. The hot key is provided for cases of desired redial out of an audio advertisement resulting from a busy condition.

In step 444, the audio response system determines whether the caller has depressed the hot key. If the hot key has been selected, the system initiates a redial feature in step 446. Clearly, this option is applicable only for those unsuccessful calls that included a valid phone number. In a preferred embodiment, the call is redialed from the same switch which processes the action list. In an alternative embodiment, the call is off-loaded to another switch for further processing.

While the invention has been particularly shown and described with reference to preferred embodiments thereof, it will be understood by those skilled in the relevant art that various changes in form and details can be made therein without departing from the spirit and scope of the invention.

What is claimed is:

1. A system for providing an audio response to an unsuccessful connection, comprising:

means for defining, for each of a plurality of specified conditions, an action list that defines a list of actions to be sequentially executed, wherein at least one action list includes audio responses and command codes;

means for defining a predicate action table, said predicate action table including an action list for each of said plurality of specified conditions, wherein at least one specified condition identifies a calling party based on a combination of telephone call attributes and caller attributes that are associated with an unsuccessful connection, wherein telephone call attributes include attributes pertaining to the unsuccessful connection and caller attributes include attributes that are stored in a customer telephone account record associated with a calling party;

means for retrieving telephone call attributes and caller attributes associated with the unsuccessful connection;

means for determining whether any one of said plurality of specified conditions in said predicate action table is satisfied by said retrieved telephone call attributes and caller attributes; and means for executing an action list associated with a satisfied condition, wherein if said action list associated with said satisfied condition includes an audio response, said audio response is transmitted to the caller of said unsuccessful connection.

2. The system of claim 1, wherein said means for determining compares said retrieved telephone call attributes and caller attributes to each of said plurality of specified conditions until a condition is satisfied.

3. The system of claim 1, further comprising means for executing a default action list if no condition is satisfied.

4. The system of claim 1, further comprising means for invoking an executable program identified by a command code in said action list.

5. The system of claim 1, further comprising:
   means for monitoring for a user hot key; and
   means for initiating a redial of said unsuccessful connection upon detection of said user hot key.

6. The system of claim 1, wherein said means for retrieving comprises means for receiving attribute information that is transmitted in a LIFD format, said LIFD format including a length field, an identifier field that identifies the type of data, a format field that identifies a data format and a data field that includes attribute information.

7. In a telecommunications system, a method for providing an audio response to an unsuccessful connection, comprising the steps of:
   (1) defining, for each of a plurality of specified conditions, an action list that defines a list of actions to be sequentially executed, wherein at least one action list includes audio responses and command codes;
   (2) defining a predicate action table, said predicate action table including an action list for each of said plurality of specified conditions, wherein at least one specified condition identifies a calling party based on a combination of telephone call attributes and caller attributes that are associated with an unsuccessful connection, wherein telephone call attributes include attributes pertaining to the unsuccessful connection and caller attributes include attributes that are stored in a customer telephone account record associated with a calling party;
   (3) retrieving telephone call attributes and caller attributes associated with the unsuccessful connection;
   (4) determining whether any one of said plurality of specified conditions in said predicate action table is satisfied by said retrieved telephone call attributes and caller attributes; and
   (5) executing an action list associated with a satisfied condition, wherein if said action list associated with said satisfied condition includes an audio response, said audio response is transmitted to the caller of said unsuccessful connection.

8. The method of claim 7, wherein said step (3) comprises the step of retrieving a destination phone number associated with said unsuccessful connection.

9. The method of claim 7, wherein said step (3) comprises the step of retrieving a source phone number associated with said unsuccessful connection.

10. The method of claim 7, wherein said step (3) comprises the step of retrieving a date-time stamp associated with said unsuccessful connection.

11. The method of claim 7, wherein said step (4) comprises the step of sequentially comparing said retrieved telephone call attributes and caller attributes to each of said plurality of specified conditions until a condition is satisfied.

12. The method of claim 7, wherein said step (4) comprises the step of comparing said attributes to a set of conditions that includes a single condition.

13. The method of claim 7, further comprising the step of:
   (6) executing a default action list if said step (4) determines that no condition is satisfied.

14. The method of claim 7, wherein said step (4) comprises the step of comparing one or more attributes to an arithmetic threshold.

15. The method of claim 7, wherein said step (4) comprises the step of determining whether the application of a plurality of attributes in said set of attributes satisfies a boolean condition.

16. The method of claim 7, wherein said step (5) comprises the step of processing a command code.

17. The method of claim 16, wherein said step (5) comprises the step of processing a command code that repeats an action list.

18. The method of claim 17, wherein said step (5) comprises the step of processing a command code that invokes an executable program.

19. The method of claim 7, further comprising the steps of:
   (6) monitoring for a user hot key; and
   (7) initiating a redial of said unsuccessful connection upon detection of said user hot key.

20. A system for providing an audio response to an unsuccessful connection, comprising:
   means for defining, for each of a plurality of specified conditions, an action list that defines a list of actions to be sequentially executed, wherein at least one action list includes audio responses and command codes:
   means for retrieving telephone call attributes and caller attributes associated with an unsuccessful connection, wherein telephone call attributes include attributes pertaining to the unsuccessful connection and caller attributes include attributes that are stored in a customer telephone account record associated with a calling party;
   means for determining whether any of said plurality of conditions is satisfied by said retrieved telephone call attributes and caller attributes, wherein each condition in said set of conditions is distinct and includes at least one attribute of an unsuccessful connection; and
   means for executing an action list associated with a satisfied condition, wherein if said action list associated with said satisfied condition includes an audio response, said audio response is transmitted to the caller of said unsuccessful connection.

21. In a telecommunications system, a method for providing an audio response to an unsuccessful connection, comprising the steps of:
   (1) defining, for each of a plurality of specified conditions, an action list that defines a list of actions to be sequentially executed, wherein at least one action list includes audio responses and command codes;
   (2) retrieving telephone call attributes and caller attributes associated with an unsuccessful connection, wherein telephone call attributes include attributes pertaining to the unsuccessful connection and caller attributes include attributes that are stored in a customer telephone account record associated with a calling party;
   (3) determining whether any of said plurality of conditions is satisfied by said retrieved telephone call attributes and caller attributes, wherein each condition in said set of conditions is distinct and includes at least one attribute of an unsuccessful connection; and
   (4) executing an action list associated with a satisfied condition, wherein if said action list associated with said satisfied condition includes an audio response, said audio response is transmitted to the caller of said unsuccessful connection.

* * * * *